（12）United States Patent
Chiu et al.

(10) Patent No.: US 7,730,407 B2
(45) Date of Patent: Jun. 1, 2010

(54) SYSTEMS AND METHODS FOR BOOKMARKING LIVE AND RECORDED MULTIMEDIA DOCUMENTS

(75) Inventors: Patrick Chiu, Menlo Park, CA (US); Laurent Denoue, Palo Alto, CA (US); Tohru Fuse, Santa Clara, CA (US); Qiong Liu, Milpitas, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1098 days.

(21) Appl. No.: 10/375,134

(22) Filed: Feb. 28, 2003

(65) Prior Publication Data

US 2004/0169683 A1   Sep. 2, 2004

(51) Int. Cl.
*G06F 3/00* (2006.01)

(52) U.S. Cl. .................. 715/732; 715/721; 715/723; 715/805

(58) Field of Classification Search .................. 715/805
See application file for complete search history.

(56) References Cited

U.S. PATENT DOCUMENTS

| | | | | |
|---|---|---|---|---|
| 5,625,410 A * | 4/1997 | Washino et al. ............. | 348/154 |
| 5,717,879 A | 2/1998 | Moran et al. | |
| 5,826,102 A * | 10/1998 | Escobar et al. ............. | 715/202 |
| 5,852,435 A * | 12/1998 | Vigneaux et al. ............ | 345/428 |
| 5,884,056 A * | 3/1999 | Steele ......................... | 715/738 |
| 6,298,129 B1 * | 10/2001 | Culver et al. ........... | 379/202.01 |
| 6,452,615 B1 | 9/2002 | Chiu et al. | |
| 7,298,930 B1 * | 11/2007 | Erol et al. .................... | 382/305 |
| 7,356,763 B2 * | 4/2008 | Lin et al. ..................... | 715/205 |
| 7,466,334 B1 * | 12/2008 | Baba ....................... | 348/14.06 |
| 2002/0054074 A1 * | 5/2002 | Sugano et al. .............. | 345/730 |
| 2003/0007663 A1 * | 1/2003 | Wixson et al. .............. | 382/100 |
| 2003/0174160 A1 * | 9/2003 | Deutscher et al. ........... | 345/716 |
| 2004/0008970 A1 * | 1/2004 | Junkersfeld et al. ........... | 386/69 |
| 2004/0205478 A1 * | 10/2004 | Lin et al. ................. | 715/500.1 |
| 2005/0154637 A1 * | 7/2005 | Nair et al. ..................... | 705/14 |
| 2005/0216851 A1 * | 9/2005 | Hull et al. .................... | 715/764 |
| 2007/0156627 A1 * | 7/2007 | D'Alicandro .................. | 707/1 |
| 2007/0204229 A1 * | 8/2007 | Erol et al. .................... | 715/730 |

FOREIGN PATENT DOCUMENTS

| | | |
|---|---|---|
| JP | 2000099524 A | 4/2000 |
| JP | 2000341660 A | 12/2000 |
| WO | 02073462 A | 9/2002 |

OTHER PUBLICATIONS

Chiu et al., "Taking notes in meetings with digital video and ink," Proceedings of ACM Multimedia '99 (1999).*

(Continued)

*Primary Examiner*—Ryan F Pitaro
(74) *Attorney, Agent, or Firm*—Sughrue Mion, PLLC

(57) ABSTRACT

Systems and methods for bookmarking multimedia documents include displaying multiple multimedia streams, creating bookmarks comprising time signatures and snapshots of each multimedia stream based upon single action cues from a user, associating snapshots with portions of multimedia streams, displaying bookmarks and displaying portions of a multimedia stream associated with selected snapshots.

16 Claims, 7 Drawing Sheets

OTHER PUBLICATIONS

Minneman et al., "A confederation of tools for capturing and accessing collaborative activity," *Proceedings of the ACM Multimedia '95 Conference* (1995).

Moran et al., "I'll get that off the audio: A case study of salvaging multimedia meeting records," *Proceedings of CHI '97* (1997).

Chiu et al., "Taking notes in meetings with digital video and ink," *Proceedings of ACM Multimedia '99* (1999).

Abowd et al., "Teaching and Learning as Multimedia Authoring: The Classroom 2000 Project," *Proceedings of the ACM Multimedia '96 Conference* (1996).

Lamming et al., "Activity-based information technology and support of personal memory," (*Proc. Information Processing '92*) (1992).

Whittaker et al., "Filochat: handwritten notes provide access to recorded conversations," *Proceedings of CHI '94* (1994).

Wilcox et al., "Dynomite: A Dynamically Organized Ink and Audio Notebook," *Proceedings of CHI '97* (1997).

Chiu et al., "An Internet-based system for multimedia minutes," *Proceedings of Tenth World Wide Web Conference* (2001).

Davis et al., "NotePals: Lightweight note sharing by the group, for the group.," *Proceedings of the CHI '99 Conference* (1999).

D. Bargeron et al., "Annotations for streaming video on the Web: system design and usage studies", Proceedings of the Eighth International World Wide Web Conference (Toronto, Canada, May 1999).

B. Harrison et al., "Designing video annotation and analysis systems", Graphics Interface '92, Morgan-Kaufmann, pp. 157-166, 1992.

L. He et al., "Auto-Summarization of Audio-Video Presentations", Proceedings of MultiMedia '99, pp. 489-498, 1999.

S. Mukhopadhyay, et al., "Passive capture and structuring of lectures", Proc. ACM Multimedia '99, ACM, New York, pp. 477-487, 1999.

L. Stifelman et al., The Audio Notebook"Paper and Pen Interaction with Structured Speech".

K. Weber et al., "Marquee: A Tool for Real-Time Video Logging".

JPO Office Action Dated Sep. 29, 2009 in Japanese patent appln. No. 2004-050640.

\* cited by examiner

BOOKMARKING SYSTEM ARCHITECTURE

SYSTEMS AND METHODS FOR BOOKMARKING LIVE AND RECORDED MULTIMEDIA DOCUMENTS

BACKGROUND OF THE INVENTION

1. Field of Invention

This invention is directed to systems and methods for bookmarking live and/or recorded multimedia documents or multimedia streams.

2. Description of Related Art

Various forms of remote interaction with multimedia streams are known. Technologies associated with distance learning or video conferencing allow large numbers of users to view a multimedia presentation in real time, or asynchronously, from remote locations while taking notes or marking important portions of the multimedia stream. Digital multimedia recordings of meetings, seminars and classes are becoming more widely available. Systems and methods for taking notes with respect to various sorts of multimedia recordings using laptops, pen-based and/or tablet type notebook computers, personal digital assistants and the like, have been developed. The NOTELOOK™ and LITEMINUTES™ products, by Fuji Xerox Company, Limited, are examples of such systems and methods. The NOTELOOK™ system is described in detail in U.S. Pat. No. 6,452,615, which is incorporated herein by reference in its entirety. Further, various ways of annotating interesting points in a meeting or other video stream have been devised to use various devices, such as described above, keytags or wireless telephones. These annotations are generally time-stamped and/or associated with video streams for browsing through the video streams and/or for retrieving specific portions of the video streams.

Another emerging practice in meetings, seminars, classes and other events is the use of digital cameras to take pictures of presentation slides, whiteboard notations and the people attending the event. While digital cameras can be convenient, the results produced by commemorating an event in this fashion are not ideal because a user has limited positions and angles available to take the pictures. Furthermore, at any particular moment, the user can only take one picture. Often, it is desirable to have multiple pictures from different perspectives at any particular moment, as well as pictures of the presentation slides.

Souvenir i-Recall™ is a web-based application for personal digital assistance and laptops. The Souvenir i-Recall™ product permits the creation of text notes correlated to a multimedia stream. Bookmarks created by Souvenir i-Recall™ do not include images or multimedia snapshots.

The eMarker™ by Sony is a device similar to a keytag that permits a user to mark a song heard on the radio. The user uploads the marks to a server and the marks provide links to information about or related to the content being played on the radio at the time the mark was made.

Minneman et al., "A confederation of tools for capturing and accessing collaborative activity," *Proceedings of the ACM Multimedia '95 Conference* (1995), incorporated by reference herein in its entirety, describes a system in which a single switch is used to create indexes into a captured meeting. Moran et al., "I'll get that off the audio: A case study of salvaging multimedia meeting records," *Proceedings of CHI '97* (1997), incorporated by reference herein in its entirety, also describes applications for indexing captured meetings.

Chiu et al., "Taking notes in meetings with digital video and ink," *Proceedings of ACM Multimedia '99* (1999), and U.S. Pat. No. 6,452,615, both of which are incorporated by reference herein in their entirety, disclose a system for notetaking with digital and ink. In Chiu et al., images can be snapped into note pages and correlated with a video steam of a meeting. Users can snap an image or a sequence of images into a note page for annotation with digital ink. Multiple images annotated with digital ink can be incorporated into a note page, but each image and annotation has a different time stamp.

Abowd et al., "Teaching and Learning as Multimedia Authoring: The Classroom 2000 Project," *Proceedings of the ACM Multimedia '96 Conference* (1996), incorporated by reference herein in its entirety, discloses an application for indexing a captured meeting using a personal digital assistant. Abowd requires that slide images be preloaded into the personal digital assistant. Other standalone note taking systems that time stamp notes and correlate the notes to audio video are also known. See, for example, Lamming et al., "Activity-based information technology and support of personal memory," (*Proc. Information Processing '92*) (1992), Whittaker et al., "Filochat: handwritten notes provide access to recorded conversations," *Proceedings of CHI '94* (1994), "Dynomite: A Dynamically Organized Ink and Audio Notebook," *Proceedings of CHI '97* (1997) and Chiu et al., "An Internet-based system for multimedia minutes," *Proceedings of Tenth World Wide Web Conference* (2001), all of which are incorporated by reference herein in their entirety.

Davis et al., "NotePals: Lightweight note sharing by the group, for the group.," *Proceedings of the CHI '99 Conference* (1999), incorporated by reference herein in its entirety, describes notetaking on personal digital assistance and subsequently uploading the notes to a server.

SUMMARY OF THE INVENTION

While the above-described systems and methods for bookmarking and/or notetaking with respect to multimedia documents are useful, enhanced systems and methods for bookmarking live and/or recorded multimedia documents, which provide bookmarking of a greater array of information would be of value.

This invention separately provides systems and methods for bookmarking live and/or recorded multimedia documents.

This invention separately provides systems and methods for creating a bookmark including snapshots of multiple different multimedia streams.

This invention separately provides systems and methods for creating bookmarks including snapshots of slides and/or bookmarks including keywords.

This invention separately provides systems and methods for bookmarking a multimedia document in which a user can create a multimedia bookmark with a single action.

This invention separately provides systems and methods for bookmarking multimedia documents in which a user can view the bookmark which comprises multiple snapshots.

This invention separately provides systems and methods for bookmarking multimedia documents in which a user can view a portion of a multimedia stream associated with a particular snapshot.

In various exemplary embodiments of the systems and methods for bookmarking multimedia documents according to this invention, bookmarks that include snapshots of multiple multimedia streams to support effective retrieval and browsing of the multimedia streams are provided.

In various exemplary embodiments of the systems and methods according to this invention, a user is able to produce a bookmark including multiple snapshots of a multimedia stream. In various exemplary embodiments, the systems and methods of this invention include a "one-click" method for bookmarking live and/or recorded multimedia documents. In various exemplary embodiments, the systems and methods according to this invention can include bookmarking with hand-held devices such as personal digital assistants, cell phones with displays, pen and/or tablet computers and laptops. In various exemplary embodiments, with the single push of a button, a user can create a bookmark that captures a multimedia snapshot and provides an index into the multimedia document. Each multimedia snapshot includes multiple video key frame images. In various exemplary embodiments, the multimedia bookmark can also include keywords. In various exemplary embodiments, the snapshots produced using the systems and methods according to this invention assist users in identifying and finding individual bookmarks from a collection of bookmarks. If the content of a bookmark provides insufficient information to a user for some reason, in various exemplary embodiments, the user can select a snapshot to playback and to view one or more portions of a multimedia stream associated with that snapshot.

In various exemplary embodiments, the systems and methods of this invention include displaying multiple multimedia streams, creating a bookmark comprising a time signature and snapshots of each multimedia stream based on a single action by a user, associating snapshots with portions of the multimedia stream, displaying the bookmarks and displaying the portions of the multimedia stream associated with a selected snapshot.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail with respect to the following drawings, in which like reference numerals indicate like elements, and wherein.

DETAILED DESCRIPTION OF EXEMPLARY EMBODIMENTS

Figure 1:
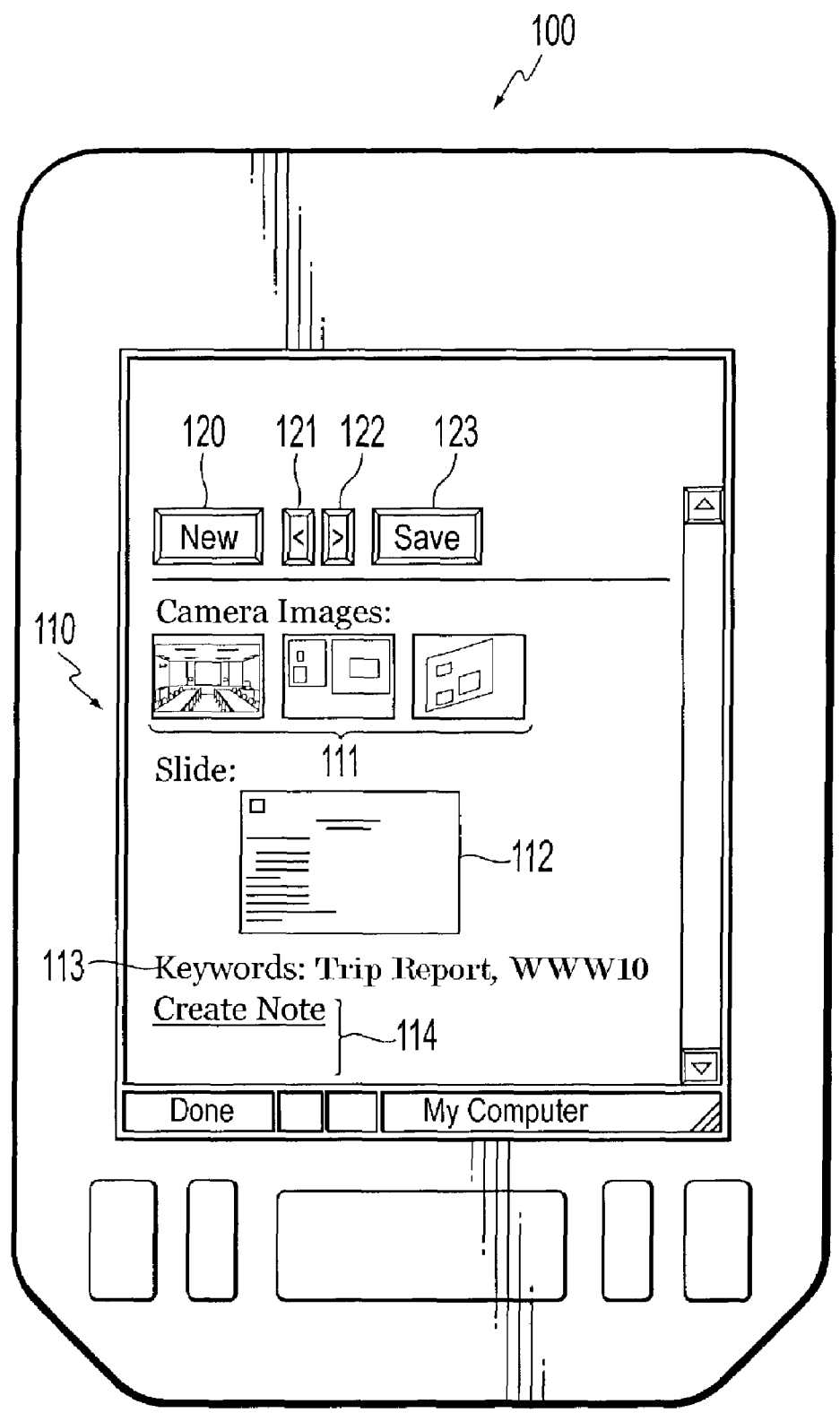
FIG. 1 is a screen shot of one exemplary embodiment of a multimedia snapshot according to this invention displayed on a hand-held computer device.

FIG. 1 shows a hand-held computer 100 having a computer display screen 110 illustrating one exemplary embodiment of a display screen generated by one exemplary embodiment of the bookmaking system according to this invention. The screen 110 includes a Web-based interface running inside Microsoft Internet Explorer™ displaying three camera video images 111, one slide video image 112, keywords 113, and a Create Note area 114.

In the exemplary embodiment shown in FIG. 1, the handheld computer 100 runs a routing, application, module, program or the like to create the display screen 110. To run the application or the like, a user connects to a Web site on a network. A servlet accessible on the accessed network site creates a session for the client device and user name. If the event under consideration is a live meeting being recorded, the time and place displayed at the meeting identifies the multimedia recording being bookmarked by this program and this user. If the user is bookmarking a multimedia document during playback, for example, the name of the document or a pointer to the multimedia document is used to identify the multimedia document.

A user may create a bookmark with a single action, such as, for example, a "one-click" operation. The servlet generates a bookmark, which includes a time index and a multimedia snapshot, based on the received single action user input. In various exemplary embodiments, this multimedia bookmark snapshot includes one or more of the video images 111, the slide image 112, and the keywords 113. As shown in FIG. 1, the multimedia bookmarks 110 can also include user notes in the note area 114.

The bookmark snapshot 110 may then be sent to the user/client's device and/or the user/client's network browser over a network, such as, for example, the Internet, which may be wired (including optical wire) and/or wireless. In various exemplary embodiments, bookmark snapshots 110 may be sent to a user/client device's Web browser via HTTP over a network. In various exemplary embodiments, a link may provide one or more designated formats, including designated standard formats, such as, for example, HTML or HTML Form format, for entering one or more user notes. In the exemplary embodiment shown in FIG. 1, the bookmark data is in an XML format, which may be easily processed by other applications and Web services. The bookmark data may also be used as MPEG-7 metadata. The bookmarks may be timestamped and may provide indexes into the multimedia.

The video source may be handled by a network server, which contains or has access to the video input, and which transmits video, audio, as well as metadata to a client routing, application, module, program or the like via a network, which may be wired and/or wireless. Multiple instances of servers and clients can operate together, even on the same device. In various exemplary embodiments, a server is configured for all multimedia, including video, channels, for example, three channels, which would service any number of clients. The video source can be captured in a variety of ways, such as, for example, from a room camera or document camera, from a tap into a projector, TV, VCR or any other video stream, and/or from a small portable camera attached to a hand-held computer. It should be appreciated that the incorporated 615 patent discloses using a different server for each of three video channels and switches between them, displaying only one channel at a time. In contrast, in various exemplary embodiments, the systems and methods of this invention display three video channels at one time, obviating the need for a switcher, although if one decided not to display a plurality of video streams simultaneously, one could provide a switcher to switch between different displayed video streams.

Figure 2:
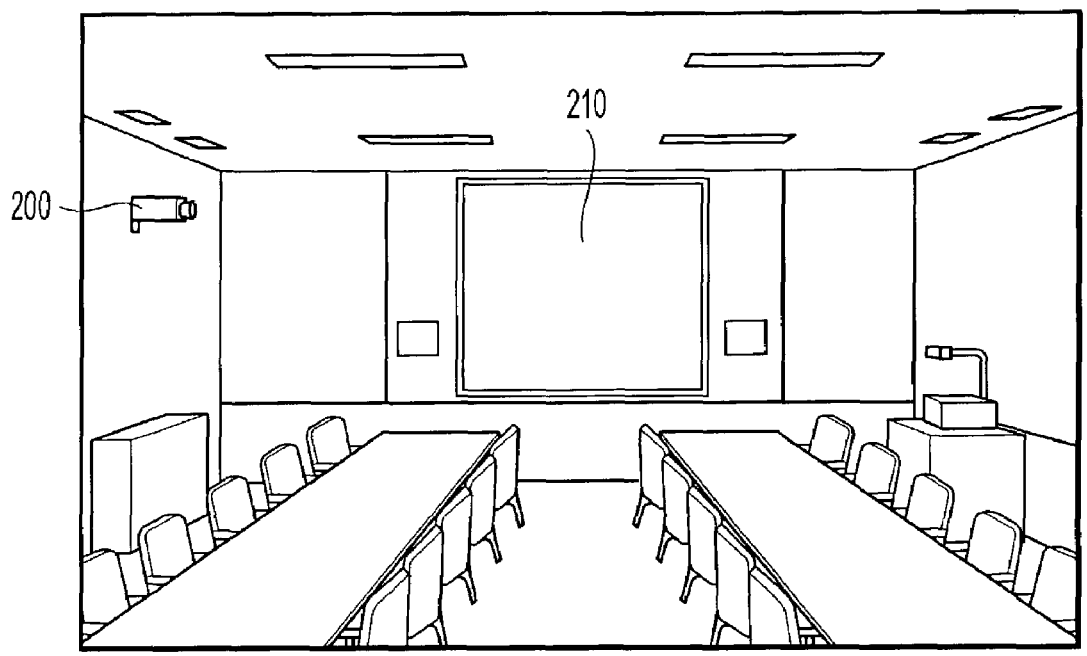
FIG. 2 is a forward looking view of a video conferencing facility usable with the systems and methods according to this invention.
Figure 3:
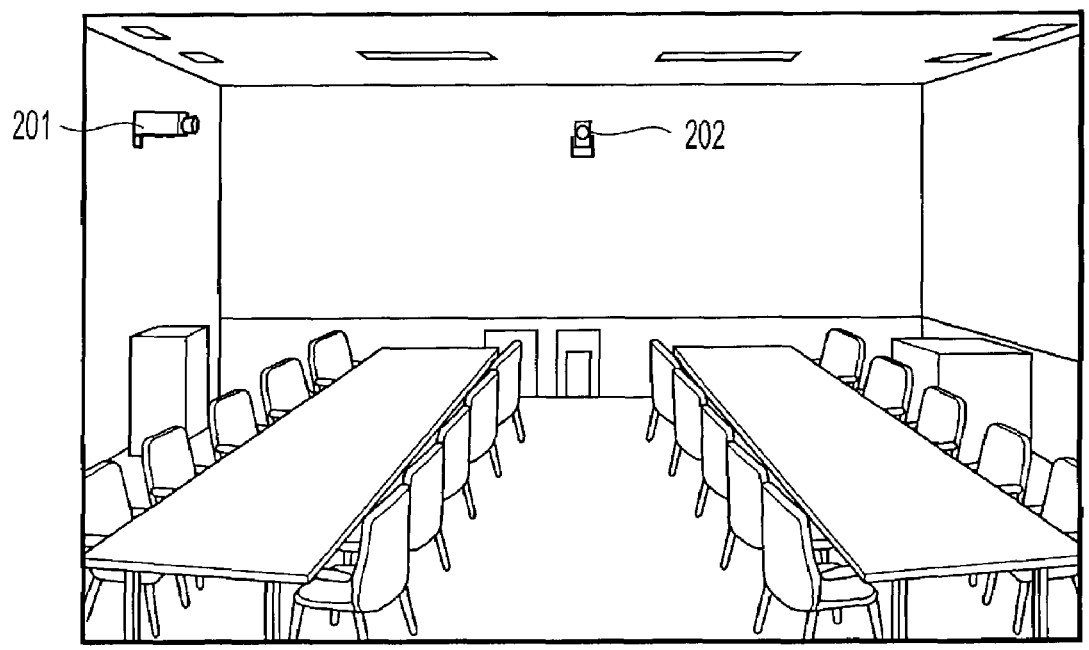
FIG. 3 is a reverse looking view of a video conferencing facility usable with the systems and methods according to this invention.

A server may be implemented like the NOTELOOK™ server shown in FIGS. 2 and 3 of the 615 patent, which are similar to FIGS. 2 and 3 of this application. FIG. 2 of this application shows a forward looking view of a video conferencing facility which includes tables, chairs, a projector and video camera 200 and projection screen 210. FIG. 3 presents a rear looking view of a video conferencing facility which includes tables, chairs, and video cameras 201 and 202. In one embodiment, there are three room cameras 200, 201, and 202, each providing a channel of video. Additional cameras with alternate or remote views may also be supported. The projection screen 210 provides another channel for the presentation content which, in various exemplary embodiments, may come from a source such as, for example, a computer, a document camera, and/or a VCR/DVD player (not shown). Such exemplary set ups require minimal preparation from the speaker. For example, in various exemplary embodiments, a speaker can plug in his or her own laptop with PowerPoint™ slides or Web pages, feed overhead slides to the document camera, or play videotapes in the VCR. None of this requires much more preparation beyond normal work practice.

In various exemplary embodiments of the systems and methods according to this invention, automatic note-taking using slide change detection may be included. In such an exemplary embodiment, output from the projector containing the presentation material may analyzed to determine when slide changes occur. Individual slides may be extracted. In various exemplary embodiments, for indexing recorded video, the points in time when slide changes occur may be displayed by marks on the timeline to give visual information that facilitates browsing.

In various exemplary embodiments, one may employ a further application of slide change detection such as, for example, frame rate compression for optimizing bandwidth over the wireless network. In various exemplary embodiments, the digital video may be captured at 15 or 30 frames a second by the server and stored for playback. Because slides typically do not change anywhere near that rate, e.g., because a presenter might change a slide every minute or two, in various exemplary embodiments, the server may transmit a video frame only when there is a slide change.

The client is a multimedia system that has video window and video handling capabilities. The features and capabilities described herein are applicable to, and may be developed on, any computer operating system of ordinary capability.

As noted above, a screenshot 10 is shown in FIG. 1. Above the video window are four buttons for interacting with the video. In various exemplary embodiments, the leftmost button 120 may be used to make a new bookmark, the rightmost button 123 may be used to save any unsaved bookmarks generated in a given session, the left arrow button 121 may be used to scroll backward to display previous bookmarks in a current session (saved or unsaved), and the right arrow button 122 may be used to scroll forward through saved or unsaved bookmarks. Although not shown, in various exemplary embodiments, one may add other buttons to change video channels, and to enlarge or reduce portions of the bookmark, and to show a timeline, including the current time position of the video. These features may be used to facilitate browsing and reviewing.

Figure 4:
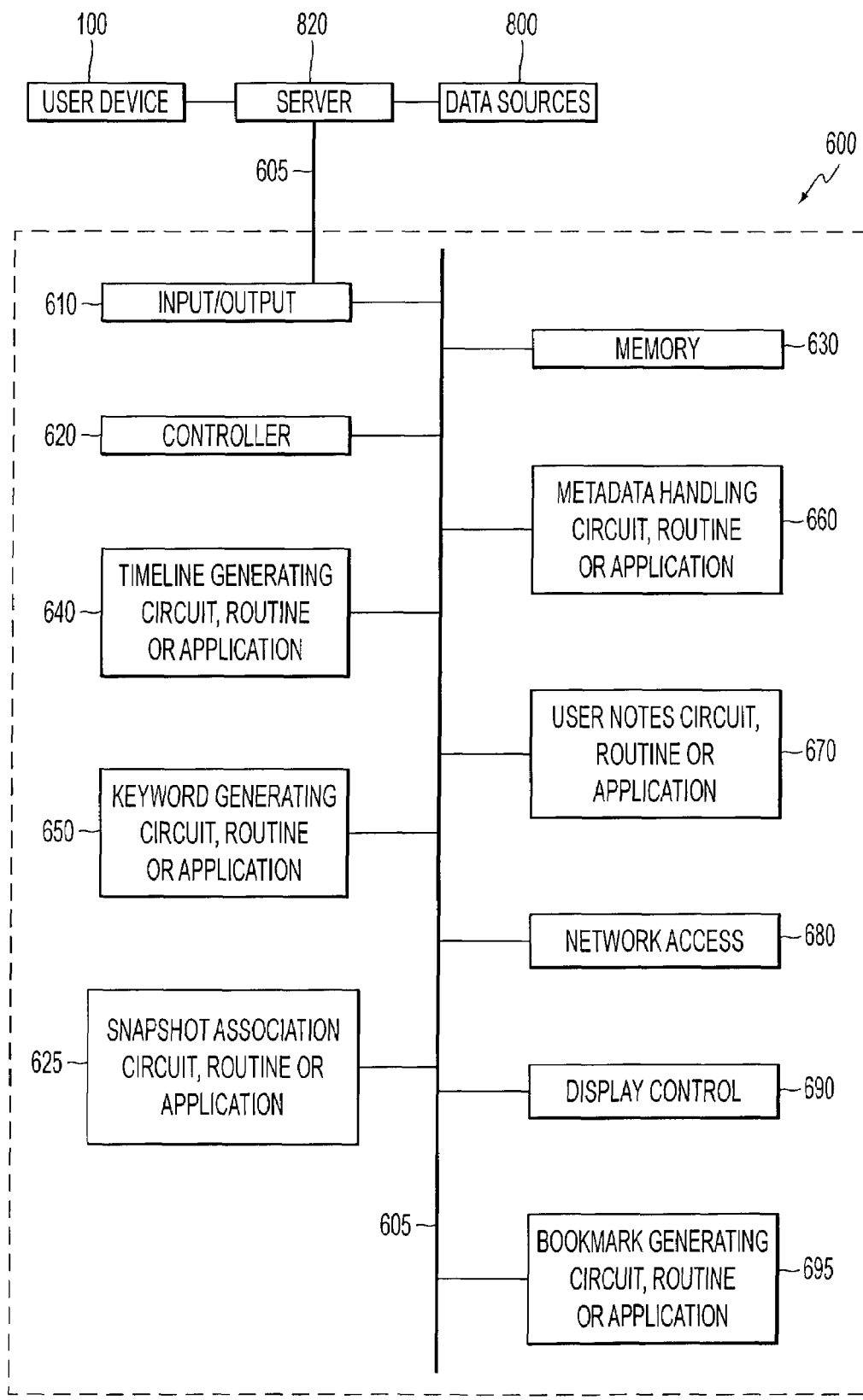
FIG. 4 is a block diagram illustrating one exemplary embodiment of a system architecture of a multimedia bookmarking system according to this invention.

FIG. 4 illustrates a block diagram of one exemplary embodiment of a device for operating the user/client device 100. Data sources 800, such as media stream(s) and metadata 800 are received from the server 820. A storage device or memory 630 may be used to maintain storage of the program, routine or application and any note files or other data created or saved during a session.

In this exemplary embodiment, a processor 600 receives user inputs (such as bookmark clicks) and directs channel selection, and output (snapshots) to the display screen 110 of user/client device 100. In various exemplary embodiments, the processor 600 may also initiate user requests sent to the server 800 such as recall or playback of a video at a specific timestamp or bookmark, for example.

When loaded with the program, the processor 600 performs the operations described above. The processor itself may include, but is not limited to, specific devices such as those shown in the block diagram of FIG. 4. For example, the processor 600 may include an input/output circuit, routine or application 610, a controller 620, a memory 630, a timeline generating circuit, routine or application 640, a keyword generating circuit, routine or application 650, a metadata handling generating circuit, routine or application 660, a user notes generating circuit, routine or application 670, a network access circuit, routine or application 680, a display control generating circuit, routine or program 690, and a bookmark generating circuit, routine or program 695.

In various exemplary embodiments, during a bookmarking session, each instance of a client produces a bookmark file consisting of bookmark information (including live video, slide and keyword information) and displays it on the computer/device screen, with or without user-added notes. These objects are timestamped, which provides an additional index into the video streams.

The storage/memory 630 shown in FIG. 4 can be implemented using either or both of alterable or non-alterable memory. The alterable portions of the storage/memory 630 can also be implemented using a floppy disk and disk drive, a writable optical disk and disk drive, a hard drive, flash memory or the like. The non-alterable portions of the storage/memory 630 are, in various exemplary embodiments, implemented using ROM. However, the non-alterable portions can also be implemented using other non-alterable memory, such as PROM, EPROM, EEPROM, an optical ROM disk, such as a CD-ROM or a DVD-ROM, and disk drive, or other non-alterable memory, or the like.

In general, the one or more input devices 610 will include any one or more of a keyboard, a keypad, a mouse, a track ball, a track pad, a touch screen, a microphone and associated voice recognition system software, a joy stick, a pen-based system, or any other known or later-developed system providing control and/or data signals to the bookmarking system 100. The one or more input devices 610 can further include any manual or automated device usable by a user or other system to present data or other stimuli to the filtering and viewing system 100. For example, the one or more input devices 610 can include any known or later-developed device or technology suitable for notebook marking a multimedia stream, such as a remote laptop computer, pen-based notebook computer or personal digital assistant. The one or more input devices 610 can further include other devices for bookmarking a multimedia stream such as keytags or cellular telephones.

The links 605 can be any known or later-developed device or system for connecting the one or more input devices 610 and various components of the annotation/bookmarking processor 600 including a direct cable connection, a connection over a wide area network or a local area network, a connection over an intranet, a connection over the internet, or a connection over any known or later-developed distributed processing network or system. In general, the links 605 can be any known or later-developed connection system or structure usable to connect the one or more input devices 820 and/or one or more user devices 100, and the various components of the annotation/bookmarking processor 600. The links 605 can further encompass any known or later-developed device or devices for wirelessly connecting remote devices.

In operation, multiple multimedia streams may be obtained other than by a user operating the annotation/bookmarking processor 600 to bookmark a multimedia document. The multiple multimedia streams may have been created or recorded by another user prior to use by the incident user. The multiple multimedia streams can be displayed on the annotation/bookmarking processor 600 by providing data using one or more of the one or more input devices 820 that are suitable for providing a multimedia document to the annotation/bookmarking processor 600 simultaneously with the occurrence of the subject matter of that multimedia document. Alternatively, the one or more input devices 610 can include a device or devices that are usable to transmit or convey a previously recorded multimedia document to the annotation/bookmarking processor 600.

When the multimedia document is provided to the bookmarking system, the multimedia document is stored by the controller 620 in the storage memory 630. The processor controller 620 then provides the multiple multimedia streams stored in the storage memory 630 to the multimedia stream display control 690. The multimedia stream display control 690, under control of the processor controller 620, displays the multiple multimedia streams on the user device 100.

As the multiple multimedia streams are displayed on the user device 100, a user can use one or more of the one or more input devices 610 to provide a single action cue to the bookmarking processor 600. When the single action cue is provided to the bookmarking processor 600, the bookmark creating circuit or routine 695, under control of the controller 620, acts to create a bookmark including a time signature. The controller 620 stores the bookmark created by the bookmark creating circuit or routine 695 in the storage/memory 630.

The controller 620 then provides the bookmark including a time signature to the snapshot associating circuit, routine or application 625. The snapshot associating circuit or routine 625, under control of the controller 620, associates snapshots of the multiple multimedia streams occurring at the time that the time signature was made, with the bookmark. The bookmark with associated snapshot is then stored by the controller 620 in the memory 630.

The controller 620 then accesses at least some of the bookmarks with associated portions of the multimedia streams stored in the memory 630 and provides the access data to the bookmark display control 690. The annotation/bookmark display control 690, under control of the controller 620, creates or modifies a user interface for displaying the bookmarks. Upon completion of the displaying operation by the annotation/bookmark display control 690, the control 620 then stores the user interface generated by the annotation/bookmark display control 690 in the memory 630.

The controller 620 then accesses the user interface generated or modified by the bookmark display control 690 from the memory 630, and displays the user interface on the user device 100. When the user selects one of the snapshots included in the annotation/bookmark displayed on the user device 100, the controller 620 provides the associated portions of the multimedia streams, which are displayed on the user device 100.

It should be appreciated that the annotation/bookmarking processor 600 shown in FIG. 4 can be implemented as a portion of a program general purpose computer used to control the operation of the display 110. Alternatively, the annotation/bookmarking processor 600 can be implemented using an ASIC, a digital signal processor (DSP), an FPGA, a PLD, a PLA, or a PAL, or using physically distinct hardware circuits, such as discrete logic elements or discrete circuit elements. The particular form of the processor 600, shown in FIG. 4, will take as a design choice and will be obvious and predictable to those skilled in the art. Alternatively, the annotation/bookmarking processor 600 can be implemented as a portion of a software program usable to perform the overall control system of a computing device. In this case, the processor 600 can be implemented as software routines, objects and/or application programming interfaces or the like.

Figure 5:
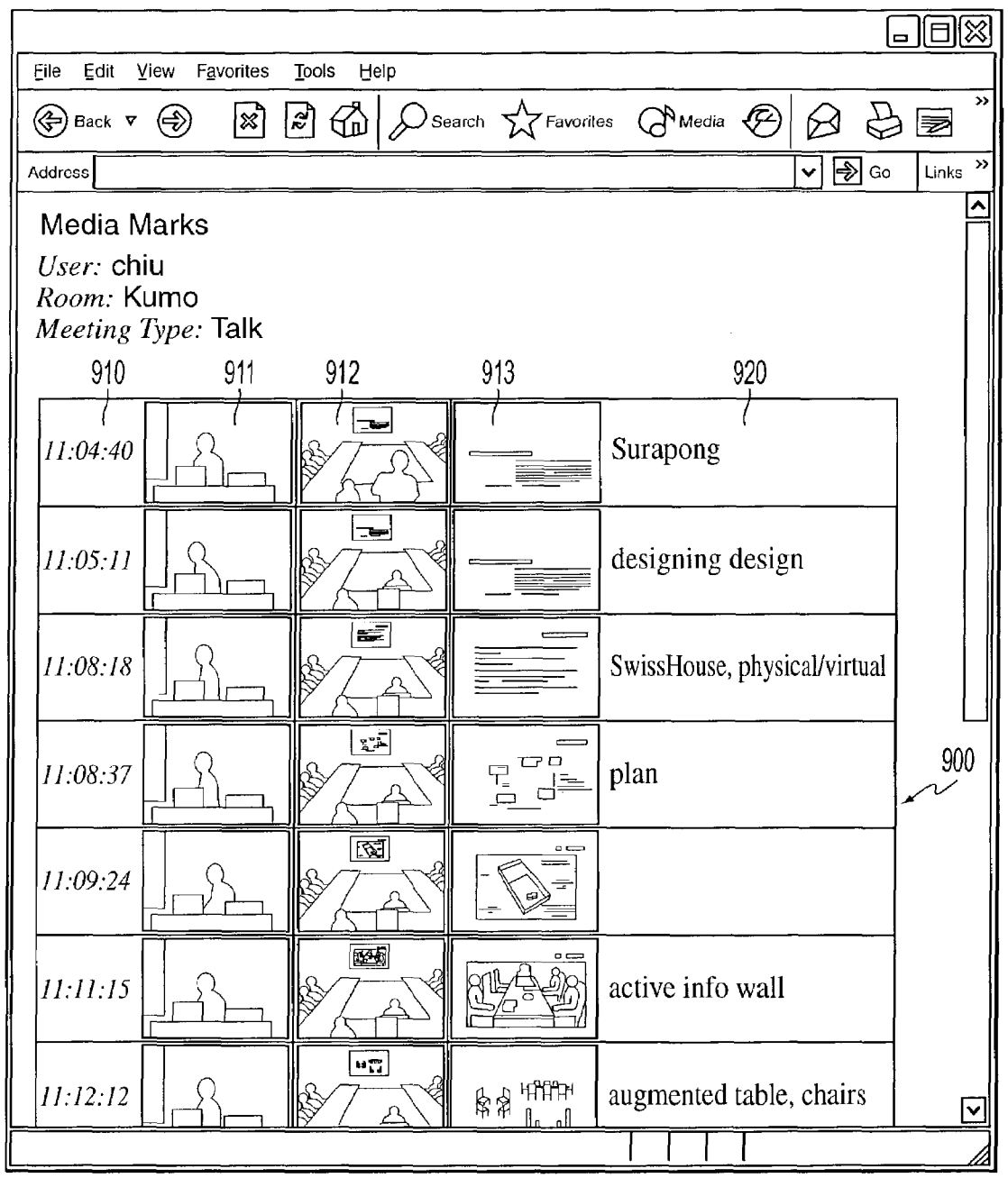
FIG. 5 is a block diagram showing one exemplary embodiment of a multimedia bookmarking file produced by the systems and methods of this invention.

FIG. 5 illustrates one exemplary embodiment of a file 900 according to the systems and methods of this invention. The file 900 has five columns. The first column shows a plurality of timestamps 910. The second column shows a plurality of snapshots 911 from a first camera. The third column shows a plurality of snapshots 912 from a second camera. The fourth column shows a plurality of snapshots 913 from a slide projector. The fifth column shows a plurality of notes 920, which may be typed and/or handwritten, for example. The first row shows three snapshots 911, 912, 913 and a printed note 920 taken at 11:04:40 hours. In various exemplary embodiments, the time stamp 910 can reflect the time that the first or second or third snapshot was taken, and/or when the note was started or finished, for example. In the exemplary embodiment of FIG. 5, each row shows three snapshots 911, 912, 913. In various exemplary embodiments, the number of snapshots may vary and can be selectable, and as can the space for notes, which may or may not have notes entered therein. In various exemplary embodiments, additional information may also be added to the file, including metadata, such as, for example, the presentation title, the subject, one or more slide breakpoints, the user name, the room location, the type of meeting, and the like. In various exemplary embodiments, instead of displaying times of the day, the time stamps 910 may operate in other time modes, including, for example, an elapsed time mode. Further, more than one time mode may be displayed at the same time. Moreover, in various exemplary embodiments, an alarm feature may be added to indicate, for example, an elapse of a specified amount of time and/or a certain time of day.

In various exemplary embodiments, after the session, a user can review the notes 920 and play a video corresponding to an object by selecting the object and pressing a "play" button (not shown). Clicking or double clicking on any of the camera images 911 and 912, the slides 913, the keywords or notes 920 is another way to play the video. For example, selecting an object will start the video at the time corresponding to the time when the object was created. Alternatively, the objects may point or link to a specific video or media segment.

A timeline, which visually maps out the note-taking activity by time, provides yet another way to browse and play the video at points of interest. To play, the user simply drags the pointer on the timeline to the desired place or clicks at a location on the timeline.

In various exemplary embodiments, the digital video streams may be saved separately by a server onto a network, and may be randomly accessed via note files taken by different users/clients. In various exemplary embodiments, the video may be saved locally with the note files. However, this may requires a large amount of file space.

Figure 6:
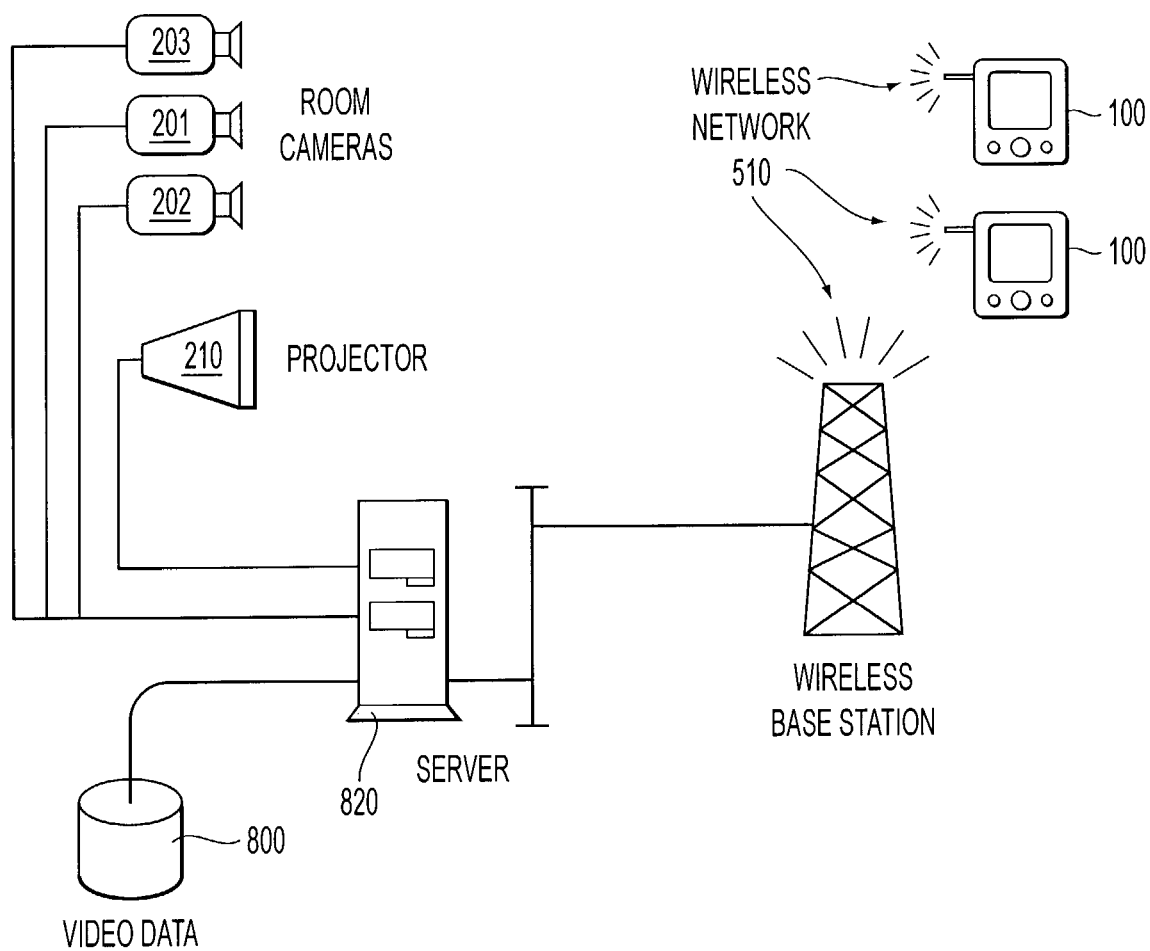
FIG. 6 is one exemplary embodiment of a multimedia bookmarking system architecture according to embodiments of this invention.

In various exemplary embodiments, the video may be transmitted to the clients by the server over a wireless network 510, as shown in FIG. 6. A server may run on any supported Windows™, Mac™, or Linux™, or other operating systems. A server may be equipped with video capture cards, and may accept composite video. In various exemplary embodiments, digital video may be captured at 15 or 30 frames a second and stored onto the network for playback.

FIG. 6 shows one embodiment of the architecture of a bookmarking system according to this invention. Video of presentation material may be fed into the projector 210 from a workstation in the room, such as a user-supplied laptop, room cameras 201-203, a document camera, VCR, and/or DVD/CD player, for example. The video is transmitted to clients over a wireless network 510. A server 820 may be equipped with video capture cards. Video data 800 is supplied to the server 820. In various exemplary embodiments, a speaker selects the desired rear projector source at the podium. Also, a room camera can be aimed at a whiteboard (not shown) in the room and be shown by projector 210. Audio may be captured by a number of ceiling microphones, combined into a single stream of audio, and stored on the network with the video. Many other combinations of audio, video, or other data may be provided as a media stream to clients.

In various exemplary embodiments, automatic slide change detection may be performed by the server. Although such detection may be performed on a hand-held computer, e.g., PDA, the server is a more efficient location for any required processing and subsequent distribution of results. One exemplary embodiment of an algorithm to distinguish between video frames is to employ a method of comparing color histograms of successive frames in the video stream to determine when a frame has changed and hence a slide change has occurred. Each detected slide change may provide a piece of metadata which is sent to the client. Indexes created from the meta data and displays marks on the timeline may be managed by a user/client. In various exemplary embodiments, the wireless bandwidth may be optimized by using frame rate compression, such as, for example, by dropping frames between slide changes. In various exemplary embodiments, the video frames and metadata may be transmitted to the clients using known methods, such as, for example, standard TCP/IP methods.

In various exemplary embodiments, frame rate compression may be utilized to save bandwidth. Automatic change detection (slide change detection, for example) may be utilized and only changes in a media stream are sent to the clients. Alternatively, a frame per second rate of material in the media stream may be reduced (i.e., a video shot at 30 fps may be reduced to 1 or 2 fps). This may result in a jittery display at the client system; however, a perfect video at the note taking device is not essential to the note taking process, and, in fact, not needed in situations where the note taker is present at the video because, for example, the note taker can hear and see what is taking place.

In various exemplary embodiments, auto indexing may also be utilized to automatically determine important video shots that may automatically be captured and made into specific bookmarks, for example, using the same change detection criteria discussed above. Such auto indexed material may also be linked to the timeline, such as the slide change as discussed above.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention also may be implemented with a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMS, EPROMs, EEPROMS, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Figure 7:
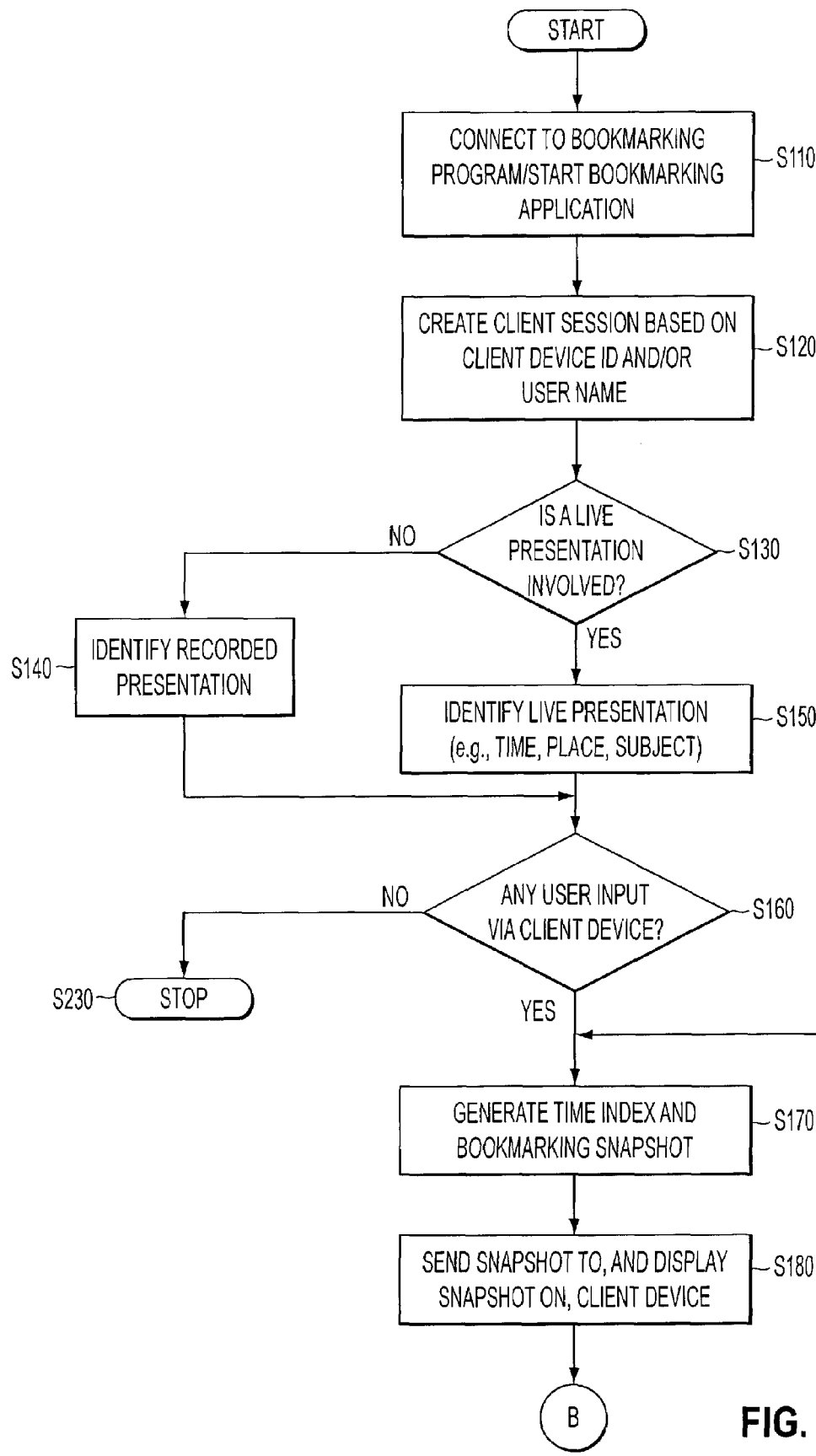
FIGS. 7 and 8 are a flowchart outlining one exemplary embodiment of a method for viewing multimedia documents according to this invention.
Figure 8:
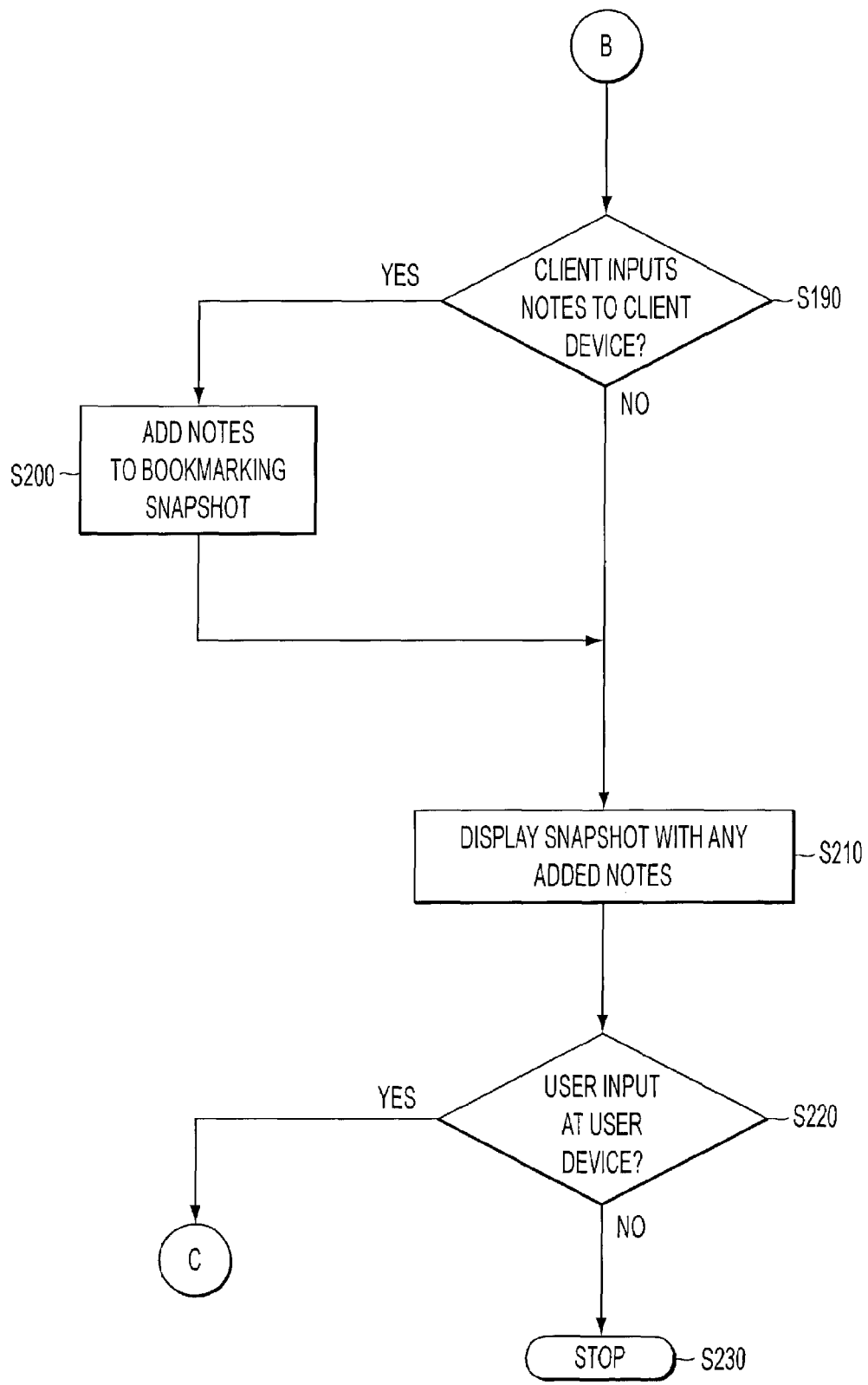

FIGS. 7 and 8 illustrate a flowchart outlining one exemplary embodiment of a method for annotating/bookmarking multimedia documents according to this invention. As shown in FIGS. 7 and 8, beginning in step S100, operation proceeds to step S110 to start a bookmarking application, such as, for example, by connecting a hand-held computer to a Web site. Then, control proceeds to step S120 where a session for the client device is created which may include a user name and/or a client device identification step.

Then in step S130, a determination is made whether the presentation respect to which content is to be annotated/ bookmarked is a live presentation. If it is a live presentation, control proceeds to step S150 and identifies the live presentation by, for example, the time and place of the meeting, or the presenter's name, or a lecture name, etc. If, however, the presentation is not a live presentation, then control proceeds to step S140 and identifies the video presentation with the name of the document, or establishes a pointer to the video presentation.

Then in step S160, a determination is made whether an input, such as a single action cue, has been received from a user. If not, operation proceeds to step S230 where the process ends. If so, operation proceeds to step S170 to generate a time index entry, and annotations/bookmarks which may include current video snapshots 111, and/or a current slide snapshot 112, and/or one or more keywords 113, and/or one or more notes 114 associated with the video snapshots 400 and slide snapshot 425 associated with one or more portions of the multimedia video stream.

Then in step S180, the bookmarks are sent to, and displayed on, the client hand-held computer.

In step S190, a determination is made of whether a user has added notes to the hand-held computer for display on the computer along with the aforementioned bookmark display information. If not, operation proceeds directly to step S210, where the aforementioned bookmark information without notations is displayed on the hand-held computer. Otherwise, operation proceeds to step S200, where the notes added by a user are added to the display on the hand-held computer in one or more areas designated therefor, and then to step S210 where the notes are displayed along with the aforementioned bookmark data generated using one-click for the hand-held computer by a user. Then, operation proceeds to step S220, to determine if another user input, such as, for example, a user generated one-click has occurred. If so, control jumps back to step S170 to generate another bookmark of multimedia data. If not, control proceeds to step S230, where the process ends.

When multiple multimedia streams are displayed in step S210, the multimedia streams can originate from any suitable source. For example, the multiple multimedia streams can be portions of a recorded multimedia document. However, in various exemplary embodiments, the multiple multimedia streams are displayed as part of a live presentation. In such embodiments, the multimedia streams can be obtained by tapping directly into the video sources, which are part of the recording or displaying during a presentation. For example, if multiple cameras are used to record a speaker and/or the audience, from several perspectives, these recording devices can be directly tapped into the video signals generated by the cameras to display multiple multimedia streams in step S210. Furthermore, if a slide presentation, such as a PowerPoint™ presentation, is being given, the display of the presentation can be directly tapped into to provide an additional multimedia stream.

The display of multiple multimedia streams is designed to also include the display of keywords. In live meetings, keywords can be extracted by performing optical character recognition on large slide images. Keywords can also be obtained, for example when PowerPoint™ is used, using the PowerPoint™ application program interface. Further, keywords can be identified from text by applying standard information retrieval algorithms. Keywords can be identified and generated by any of the above means and displayed along with the multiple multimedia streams and snapshots of those streams.

In steps S160 and S220, a single action cue may be received from a user. The single action cue can be any cue created through a single action of a user such as pointing or clicking, which can be described as a "one-click" response. When a single action cue is received from the user, a bookmark is created. The bookmark includes a time signature and snapshots of each of the multimedia streams that were displayed in step S210. Accordingly, the various perspectives, slides and keywords at the particular moment when the single action cue is made are preserved as part of the bookmark. In various exemplary embodiments, multiple single action cues will be received from a user. Accordingly, each of the single action cues will result in the creation of a separate bookmark, and corresponding separate time signatures and snapshots.

In various exemplary embodiments, the bookmark time signature and snapshots are associated with portions of a multimedia stream. Bookmark snapshots can be associated with a portion of a multimedia stream so that when the bookmark snapshots are displayed, selecting a bookmark snapshot will permit the user to view or otherwise experience the portion of the multimedia stream that has been associated with the bookmark snapshot. The portion of the multimedia stream can be associated, for example, to correlate to the time that the bookmark snapshot was taken. Accordingly, a portion of the video stream including portions before, after, or both before and after a bookmark snapshot can be displayed.

In step S210, the bookmarks are displayed. The bookmarks can be displayed at any suitable format that permits display of the time signature along with the snapshots. In various exemplary embodiments, bookmarks can be displayed in a tabular format that permits the user to view all the bookmarks at once, so that the time signature along with the relevant snapshots can be viewed.

In various exemplary embodiments, when a single action cue selecting a particular snapshot is received by the application program, the portion of the multimedia stream associated with that bookmark snapshot is displayed.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

What is claimed is:

1. A method for bookmarking a multimedia document comprising:
    creating a client session for a user through a client device; the client session allowing the user to generate a bookmark in either a live presentation or a recorded presentation;
    displaying at least one snapshot of video stream;
    displaying at least one slide of a slide presentation;
    displaying at least one keyword associated with said slide;
    creating the bookmark through the use of a single time signature; wherein the bookmark comprises a single time signature, the at least one snapshot, the at least one slide, and the at least one keyword based upon a single action cue from a user; and
    displaying the bookmark on the client session of the user and sending the bookmark to the client device,
    wherein the single time signature is associated with the at least one snapshot, the at least one slide, and the at least one keyword in the bookmark.

2. The method of claim 1, further comprising providing a display area identified for containing user-generated notes.

3. The method of claim 1, wherein the bookmark comprises a display in a form of a table having columns corresponding to the single time signature, the snapshot and the slide.

4. The method of claim 1, further comprising creating further bookmarks, each further bookmark based upon a subsequent single action cue from the user.

5. The method of claim 1, wherein the bookmark further includes a user-generated note.

6. The method of claim 5, wherein the single time signature is selected from a group consisting of a time when the snapshot was taken, a time when the user-generated note started, and a time when the user-generated note ended.

7. The method of claim 1, wherein the client session is created based on a client device ID or user name.

8. A system for bookmarking a multimedia document containing video information from a plurality of video sources, comprising:
    a user device that permits one-click input from a user;
    an element that receives multimedia document information;
    an element that receives the one-click input from the user device and generates bookmark instructions;
    a display device that displays multimedia stream information;
    a client session element that creates a client session for a user through the display device; the client session allowing the user to generate a bookmark in either a live presentation or a recorded presentation;
    a bookmark creator that upon receiving the bookmark instructions creates the bookmark through the use of a single time signature; wherein the bookmark comprises concurrent snapshots of the video information from the plurality of video sources; at least one slide of a slide presentation and at least one keyword associated with the slide; and
    a bookmark communicator that communicates the bookmark to the display device for display on the display device and wherein the bookmark is sent to the display device for the user;

wherein the single time signature is associated with the concurrent snapshots of the video information, the at least one slide and the at least one keyword in the bookmark.

9. The system of claim 8, wherein the bookmark creator is located at a location remote from the display device.

10. The system of claim 8, wherein the display device is a hand-held computer.

11. The system of claim 8, wherein the bookmark creator is connected to the display device by a network.

12. The method of claim 8, further comprising an element for receiving user-generated notes.

13. The system of claim 8, wherein the client session is created based on a client device ID or user name.

14. A method for bookmarking a multimedia document comprising:

creating a client session for a user through a client device; the client session allowing the user to generate a bookmark in either a live presentation or a recorded presentation;

displaying multiple multimedia streams comprising at least two video sources, one of said multiple multimedia streams including a slide presentation;

monitoring said slide presentation to detect a new slide;

upon detection of the new slide, creating the bookmark through the use of a single time signature; wherein the bookmark comprises a single time signature, at least one snapshot of each of the multiple multimedia streams taken concurrently, at least one keyword associated with the slide, and the new slide; and displaying the bookmark on the client device of the user and sending the bookmark to the client device of the user, wherein the single time signature is associated with the at least one snapshot, at least one keyword, and the new slide in the bookmark.

15. The method of claim 14, further comprising associating at least one user-generated note with the bookmark.

16. The method of claim 14, wherein the client session is created based on a client device ID or user name.

* * * * *